United States Patent Office 3,329,634
Patented July 4, 1967

3,329,634
SHORT OIL ALKYD RESIN HAVING AN UNUSUALLY SHORT AIR DRYING TIME
Charles J. McWhorter, Glen Ellyn, and Edgar L. Clark, Oak Park, Ill., assignors to Commercial Solvents Corporation, a corporation of Maryland
No Drawing. Filed Jan. 25, 1963, Ser. No. 253,975
2 Claims. (Cl. 260—22)

Our invention relates to alkyd resins and in particular to novel short oil alkyd resins useful in industrial coatings designed for very short air drying times.

In industrial coatings, the properties of the shortest possible air drying time consistent with good flexibility and exterior durability are very desirable for many applications and numerous products have been formulated in an attempt to meet this objective. We have now found that a short oil alkyd resin comprising the reaction product of a polyol mixture of equal parts by weight of pentaerythritol and trimethylolethane and an acid mixture of phthalic anhydride, benzoic acid and dehydrated castor oil fatty acids provides an unusually short air drying time combined with good flexibility and unusually good exterior durability.

It is surprising that such a gross ratio as 1 to 1 by weight of pentaerythritol and trimethylolethane should provide such desirable results since there is nothing of theoretical significance about this ratio. It is particularly surprising since the use of an equal hydroxyl ratio, i.e. equal numbers of pentaerythritol and trimethylolethane hydroxyl groups present in the charge, which is equivalent to a weight ratio of approximately 8 to 9 or 0.88 to 1, provides an inferior air drying time. Moreover, the use of a molar ratio of 1 to 1, which is equivalent to a weight ratio of about 9 to 8 or 1.12 to 1, provides a product which gels before the desired acid number of the alkyd resin can be reached. We have no explanation for the observed superiority of the formulation using equal parts by weight of pentaerythritol and trimethylolethane.

The product of our invention is a short oil alkyd resin comprising the reaction product of a polyol mixture of equal parts by weight of pentaerythritol and trimethylolethane with an acid mixture of phthalic anhydride, benzoic acid and 27 to 28.5 weight percent of dehydrated castor oil fatty acids based on the total of the polyol and acid mixture. Larger amounts of the fatty acid do not provide a sufficiently short air drying time. The dehydrated castor oil fatty acids are preferably those containing a low amount of hydroxy acids, preferably not more than about 3 to 8 percent of hydroxy acids. Preferably, phthalic anhydride is used although phthalic acid can be used. The amounts of phthalic anhydride and benzoic acid are adjusted to obtain the desired resin hardness without gelation. Also, the benzoic acid provides the resulting alkyd with the property of being soluble in aromatic solvents, e.g. xylene. Preferably, the alkyd comprises the reaction product of 14.6 to 15.0 weight percent of pentaerythritol, 14.6 to 15.0 weight percent of trimethylolethane, 31 to 33 weight percent of phthalic anhydride, 10 to 12 weight percent of benzoic acid and 27 to 28.5 weight percent of dehydrated castor oil fatty acids.

The novel alkyd resins of our invention are prepared by reacting the polyols and acids by conventional methods, e.g. by heating the mixture of ingredients until the desired acid number and viscosity are obtained. Preferably, all the ingredients are admixed in the presence of a suitable solvent, for example, xylene, and the ingredients heated to a temperature of about 440 to 470° F., over a period of about 6 to 9 hours until an acid number below about 6 is obtained.

The alkyds of our invention can be used as vehicles to prepare coating formulations, e.g. paints, lacquers, varnishes, enamels, by inclusion with suitable pigments, driers, solvents, diluents, etc., in a manner known to the art. The alkyds are particularly useful in formulations, particularly gloss formulations, designed to be applied where the coating is to be air dried. Such formulations are particularly desirable in assembly line operations where quick packing is desired, e.g. where a surface is sprayed on an assembly line and it is desired that the coating air dry by the time, e.g. 20 minutes, the article reaches the end of the line so that it can be lifted off by hand without leaving prints on the coating and then stacked for a sufficient time to dry completely, e.g. one hour, before packing. Such articles include, for example, water heaters, electrical lighting fixtures and imitation tile-wall board. Since the novel alkyds possess unusual durability, i.e. ability to stand weathering, they are also particularly useful for fast drying exterior coatings, such as power lawn mower finishes and automotive re-finishing.

The novel alkyds of my invention will be further illustrated by the following examples in which alkyds with different ratios of pentaerythritol and trimethylolethane were prepared and tested in enamels for drying time and durability.

Examples 1 to 3

Alkyds were prepared from pentaerythritol, trimethylolethane, phthalic anhydride, benzoic acid and dehydrated castor oil fatty acids with varying amounts of pentaerythritol and trimethylolethane. The alkyds were prepared in a 5 liter, 3 necked flask equipped with an agitator, thermometer, and solvent reflux head with water separator and overflow return for xylol. All the ingredients were charged into the flask and heated slowly to 470° F. over a four hour period. Heating was then continued until an acid number below 6 and a cure of 36

TABLE I

| | Example 1 | | Example 2 | | Example 3 | |
|---|---|---|---|---|---|---|
| | Weight percent [1] | Grams | Weight percent [1] | Grams | Weight percent [1] | Grams |
| DCO Fatty Acids | 27.9 | 558 | 26.6 | 538 | 27.9 | 558 |
| Phthalic Anhydride | 31.6 | 632 | 33.2 | 672 | 31.6 | 632 |
| Pentaerythritol | 14.8 | 297 | 13.9 | 282 | 15.7 | 314 |
| Trimethylolethane | 14.8 | 297 | 15.6 | 316 | 14.0 | 281 |
| Benzoic Acid | 10.3 | 216 | 10.7 | 216 | 10.3 | 216 |
| Xylol | | 100 | | 100 | | 100 |
| PE/TME weight ratio | | 1/1 | | 8/9 | | 9/8 |
| PE/TME hydroxyl ratio | | 9/8 | | 1/1 | | 9/7 |
| PE/TME mol ratio | | 8/9 | | 7/9 | | 1/1 |
| Viscosity, Gardner-Holdt at 50% NV in Xylol | | Z1 | | Y | | Gelled |
| Tack free time | | 20′ | | 35′ | | |

[1] Based on the total amount of fatty acids, phthalic anhydride, pentaerythritol, trimethylolethane and benzoic acid.

seconds on a 392° F. cure plate was reached. The alkyds were tested for drying time in a clear solution of the xylol in which they were prepared. The dehydrated castor oil fatty acids had the following characteristics: average molecular weight 280, acid number 197–202, saponification number 198–204, iodine number (Wijs-300% excess) 150–160, titre 5° C. maximum, and color 4 Gardner maximum. The results are tabulated in Table I.

The results show that the alkyd of Example 1 with a pentaerythritol to trimethylolethane weight ratio of 1:1 had a tack free time (a measure of print resistance) of only 20 minutes while the alkyd of Example 2 with a weight ratio of 8:9 or 0.88:1 (equivalent to an equal hydroxyl ratio) had a tack free time of 35 minutes, which is sufficiently high to be impractical for quick-drying coating operations. The alkyd of Example 3 with a weight ratio of 9:8 or 1.12:1 (equivalent to an equal molar ratio) gelled long before the desired acid number was reached. This indicates the extreme sensitivity of a slight shift away from the 1:1 ratio and the criticality of the 1:1 ratio in obtaining sufficiently early print resistance.

*Examples 4 and 5*

The alkyd of Example 1 was made into a white appliance enamel and tested against a similar enamel made with a fast drying premium commercial alkyd. The composition of the enamels in parts by weight were as follows:

| Enamel Composition | Ex. 4 | Ex. 5 |
|---|---|---|
| Titanox R A 50 [1] | 300 | 300 |
| Commercial Alkyd | 600 | |
| Alkyd of Ex. 1 | | 600 |
| Xylol | 124 | 124 |
| 6% Cobalt Drier | 1.75 | 1.75 |
| 6% Zirconium Drier | 3.5 | 3.5 |
| Exkin #2 (anti-skin) | 1.75 | 1.75 |

[1] Rutile titanium dioxide pigment.

The above enamels were allowed to air dry for 96 hours and were then coated on steel panels and tested for gloss before and after 330 hours in a weatherometer. The weatherometer was run on repeating cycles of two hours of sun followed by 18 minutes of rain. This roughly is equivalent to 12 months exposure in Florida. Gloss readings before and after exposure were as follows, demonstrating the unusual durability of the alkyd of Example 1.

| | Ex. 4 | Ex. 5 |
|---|---|---|
| Before exposure | 84 | 92 |
| After 330 hours | 70 | 84 |

*Examples 6 to 8*

The alkyd of Example 1 was made into a green enamel and tested against a similar enamel made with a urethane modified commercial alkyd (alkyd #1), a premium product highly recommended for exterior durability, and against a similar enamel made with another commercial alkyd (alkyd #2) with a long record of excellent performance in exterior exposures. The enamels were tested in a weatherometer as in Examples 4 and 5. The composition of the enamels in parts by weight and the results of testing were as follows, demonstrating the unusual durability of the alkyd of Example 1.

| Enamel Composition | Ex. 6 | Ex. 7 | Ex. 8 |
|---|---|---|---|
| Western Dry Color Co. #848 Chrome Green | 96 | 96 | 96 |
| Lecithin | 1.6 | 1.6 | 1.6 |
| Xylol | 152 | 144 | 152 |
| Commercial Alkyd #1 | 544 | | |
| Commercial Alkyd #2 | | 544 | |
| Alkyd of Ex. 1 | | | 544 |
| Gloss after 286 hours exposure in weatherometer | Good | Fair | Excellent |

We claim:
1. A short oil alkyd resin comprising the reaction product of 14.6 to 15.0 weight percent of pentaerythritol, 14.6 to 15.0 weight percent of trimethylolethane, 31 to 33 weight percent of phthalic anhydride, 10 to 12 weight percent of benzoic acid and 27 to 28.5 weight percent of dehydrated castor oil fatty acids.
2. An enamel containing the alkyd resin of claim 1.

References Cited

UNITED STATES PATENTS 2,915,488   12/1959   Kraft et al. _____ 260—22

DONALD E. CZAJA, *Primary Examiner.*

LEON J. BERCOVITZ, *Examiner.*

R. W. GRIFFIN, *Assistant Examiner.*